United States Patent
Baker et al.

(10) Patent No.: US 9,552,229 B2
(45) Date of Patent: Jan. 24, 2017

(54) SYSTEMS AND METHODS FOR TASK SCHEDULING

(71) Applicant: ATLASSIAN PTY LTD, Sydney (AU)

(72) Inventors: Brad Baker, Sydney (AU); Michael Ruflin, Sydney (AU); Joshua Hansen, Sydney (AU); Adam Hynes, Sydney (AU); Clement Capiaux, Sydney (AU); Edward Zhang, Sydney (AU)

(73) Assignee: ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 14/712,870

(22) Filed: May 14, 2015

(65) Prior Publication Data

US 2016/0335124 A1    Nov. 17, 2016

(51) Int. Cl.
G06F 9/46    (2006.01)
G06F 9/50    (2006.01)

(52) U.S. Cl.
CPC ................... *G06F 9/5038* (2013.01)

(58) Field of Classification Search
CPC ...... G06F 3/126; G06F 9/3836; G06F 9/4881; G06F 9/5038
USPC ........................................................ 718/103
See application file for complete search history.

(56) References Cited

U.S. PATENT DOCUMENTS

| 6,360,243 | B1* | 3/2002 | Lindsley | G06F 9/4843 |
| | | | | 718/103 |
| 6,438,573 | B1* | 8/2002 | Nilsen | G06F 8/10 |
| | | | | 718/100 |
| 7,165,252 | B1* | 1/2007 | Xu | G06F 9/4887 |
| | | | | 718/100 |
| 2002/0099952 | A1* | 7/2002 | Lambert | G06F 21/126 |
| | | | | 726/27 |
| 2005/0268299 | A1* | 12/2005 | Picinich | G06F 9/485 |
| | | | | 718/100 |
| 2007/0256075 | A1* | 11/2007 | Denis | G06F 9/4843 |
| | | | | 718/102 |
| 2007/0273698 | A1* | 11/2007 | Du | G06F 9/30167 |
| | | | | 345/501 |
| 2008/0282246 | A1* | 11/2008 | Dolev | G06F 9/4881 |
| | | | | 718/102 |
| 2009/0055520 | A1* | 2/2009 | Tabata | G06F 1/3221 |
| | | | | 718/100 |
| 2009/0222826 | A1* | 9/2009 | Johnson | G06F 8/61 |
| | | | | 718/102 |
| 2010/0211949 | A1* | 8/2010 | Nakajima | H04L 67/1097 |
| | | | | 718/100 |

(Continued)

OTHER PUBLICATIONS

Xu et al. "Scheduling Processes with Release Times, Deadlines, Precedence, and Exclusion Relations", Mar. 1990, vol. 16 No. 3, IEEE.*

(Continued)

*Primary Examiner* — Anna Deng
*Assistant Examiner* — Junchun Wu
(74) *Attorney, Agent, or Firm* — Hickman Palermo Becker Bingham LLP (57) ABSTRACT

Disclosed herein is a computer implemented method for scheduling a new task. The method comprises: receiving task data in respect of the new task, the task data comprising at least information enabling the new task to be uniquely identified and a target runtime for the new task; recording the received task data in a data structure and determining if a new job needs to be registered with an underlying job scheduler.

18 Claims, 5 Drawing Sheets

(56) References Cited

U.S. PATENT DOCUMENTS

| | | | | |
|---|---|---|---|---|
| 2011/0276968 A1* | 11/2011 | Kand | .................... | G06F 9/5038 |
| | | | | 718/102 |
| 2011/0289503 A1* | 11/2011 | Toub | .................... | G06F 9/4843 |
| | | | | 718/102 |
| 2012/0159499 A1* | 6/2012 | Shafiee | ................ | G06F 9/5011 |
| | | | | 718/103 |
| 2013/0247058 A1* | 9/2013 | Sirdey | ....................... | G06F 9/46 |
| | | | | 718/102 |
| 2014/0237476 A1* | 8/2014 | Steffen | .................... | G06F 9/505 |
| | | | | 718/103 |
| 2015/0169375 A1* | 6/2015 | Valpard | ................. | G06F 9/5038 |
| | | | | 718/103 |
| 2015/0220373 A1* | 8/2015 | Chen | .................. | G06F 11/0757 |
| | | | | 718/106 |
| 2015/0234675 A1* | 8/2015 | Steiss | ........................ | G06F 9/46 |
| | | | | 718/100 |
| 2015/0347177 A1* | 12/2015 | Magee | ................. | G06F 9/4818 |
| | | | | 718/103 |

OTHER PUBLICATIONS

Iturbe et al. "Runtime Scheduling, Allocation, and Execution of Real-Time Hardware Tasks onto Xilinx FPGAs Subject to Fault Occurrence", May 2012, vol. 2013, Hindawi.*

Aydin et al. "Power-Aware Scheduling for Periodic Real-Time Tasks", May 2004, vol. 53, No. 5, IEEE.*

Lipari et al. "EÆcient Scheduling of Real-Time Multi-Task Applications in Dynamic Systems", May 2000, pp. 166-175, IEEE.*

\* cited by examiner

Figure 6

SYSTEMS AND METHODS FOR TASK SCHEDULING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright ©2015 Atlassian Pty Ltd.

FIELD OF THE DISCLOSURE

The present disclosure generally relates to systems and methods for scheduling tasks.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Many computer systems and applications make use of job schedulers to schedule future work.

Issue tracking systems are one example of such systems. Issue tracking systems (variously referred to as trouble ticket systems, support ticket systems, request management systems, and incident ticket systems) manage the creation and tracking of issues in a variety of contexts.

As one example, an issue tracking system may be deployed for use by a helpdesk. A busy helpdesk may manage thousands, tens of thousands, or even more issues. Each issue may have a different priority, require different actions, be handled by different people, and/or be handled by multiple different people over its lifecycle. Furthermore, the helpdesk may be trying (or obliged) to meet certain service level agreements (SLAs) applicable to the issues being handled.

In order to assist in managing issues an issue tracking system may identify tasks that need to be performed in the future and schedule those tasks by passing them to an underlying job scheduler to handle. Where large numbers of issues are being handled, however, the number of tasks that are generated and passed to the job scheduler can exceed the working capacity of the underlying job scheduler.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

The present disclosure generally relates to systems and methods for scheduling tasks to be executed in the future and to the management and execution of such tasks.

Task scheduling is performed in many different types of computer applications and systems. For example, task scheduling is performed by: issue tracking systems (described further below), managed documentation systems (where documents are marked for periodic review); build and test systems (where cleanup jobs are periodically run per artifact being tested).

The functionality of the present disclosure will be described as being provided by a scheduling module. The scheduling module may be implemented in various ways. In one embodiment the scheduling module is implemented as a plugin (also referred to as an add-in, add on, or extension) which extends the capabilities/functionality of a host application.

For the purposes of describing various features of the scheduling module, an issue tracking system (ITS) will be used as the example host. In order to provide this context a general description of an ITS will be provided, followed by a description of a scheduling module and its operation.

Issue Tracking System

Generally speaking, an issue tracking system (which will be shortened to ITS) is a system used to manage work items or "issues". Example ITSs include JIRA and JIRA Service Desk, which are commercially available from Atlassian Pty Ltd., Sydney, Australia.

An example of one type of ITS architecture will be provided, followed by of an overview of how an ITS is used.

ITS Architecture

An ITS may be provided using a variety of different architectures. As an example, a client server architecture is described below in which the ITS functionality is provided by a server computer and accessed by users from client computers.

Figure 1:
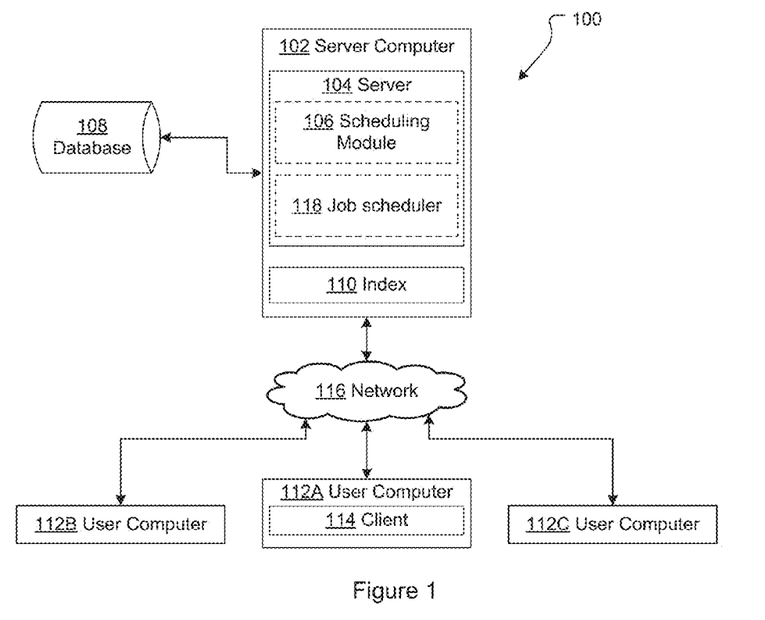
FIG. 1 illustrates a client server architecture suitable for use with the present disclosure.

FIG. 1 illustrates a single server implementation of an ITS 100. ITS 100 comprises a server computer 102. Server computer 102 hosts an ITS server 104 for providing server-side ITS functionality. The ITS server 104 comprises one or more application programs, libraries, APIs or other software elements that implement the features and functions that are further described herein. In this example the ITS server 104 includes a scheduling module 106 which provides scheduling functionality as described in detail below.

Server computer 102 also stores or has access to ITS data. ITS data generally includes: ITS metadata defining the operation of the ITS (for example, and as discussed below, issue type definitions, issue workflows, user permissions and the like); and issue data (i.e. data in respect of issues that have been entered into, and are being maintained by, the ITS). In this example ITS data is stored on and managed by a database 108, though it could be alternatively stored, for example on a local file system of the server computer 102.

Database 108 is provided by a database server which may be hosted by server 102, but will more typically be hosted on a separate physical computer in communications (directly or indirectly via one or more networks) with ITS server computer 102.

In this particular example, server computer 102 stores issue index data 110 locally, and database 108 stores additional issue data and ITS metadata. In alternative embodiments a separate index is not provided and searching is performed directly on the database 108.

System 100 also comprises a user computer 112. ITS user computer 112 hosts an ITS client 114 which provides client-side ITS functionality.

An ITS client 114 may be a general web browser application (such as, for example, Chrome, Safari, Internet Explorer, Opera). In this case the client 114 accesses the ITS server 104 via an appropriate uniform resource locator (URL) and communicates with the ITS server 104 using general world-wide-web protocols (e.g. http, https, ftp). The web browser application is configured to request, render and display electronic documents that conform to a markup language such as HTML, XML or extensions, and may be capable of internally executing browser-executable code such as JAVASCRIPT, VBScript, or other forms of code. Where the ITS client 114 is a web browser, the ITS server 104 will be a web server (such as, for example, Apache, IIS, nginx, GWS).

Alternatively, the ITS client 114 may be a specific application programmed to communicate with server 102 using defined application programming interface (API) calls. In this case the ITS server 104 will be a specific application server configured to interact with the ITS client application.

A user computer 112 may host more than one ITS client 114 (for example a general web browser client and a specific application client). Similarly, server computer 102 may host more than one ITS server 104.

The ITS server computer 102 may serve multiple user computers 112 (or, more specifically, multiple ITS clients 114). In FIG. 1 three user computers have been depicted (112A, 112B, and 112C), though more or fewer could be used.

The server computer 102 and client computer 112 communicate data between each other either directly or indirectly through one or more communications networks 116. Communications network 116 may comprise a local area network (LAN) of an enterprise in one embodiment. In this case ITS 100 may be implemented as an on-premises solution in which the server computer 102 and user computer 106 are associated with the same business enterprise and at least the server computer 102 is within an enterprise-controlled facility that is protected from open internetworks using firewalls or other security systems. In another embodiment, network 116 may represent a public internetwork and the server computer 102 may be located off-premises with respect to an organization, such as in a shared data center or cloud computing facility.

While a single server client-server architecture has been described above, an ITS may be implemented using alternative architectures. For example, in certain cases a clustered architecture may be used where multiple server computing instances (or nodes) are instantiated to meet system demand. Conversely, in the case of small enterprises with relatively simple requirements an ITS may be a stand-alone implementation (i.e. a single computer directly accessed/used by the end user).

Furthermore, the client server architecture described above could be used to implement alternative host systems/applications which are capable of making use of a scheduling module (or the scheduling functionality) described herein.

ITS Use

The type(s) of issues handled by an ITS can vary greatly depending on the scenario in which the ITS is implemented. By way of example, an ITS may be implemented in a helpdesk scenario, in which case the "issues" may be issues or tickets logged with the helpdesk. An ITS may be implemented in a project management scenario, in which case "issues" may be project tasks or work items. An ITS may be implemented in a software development scenario, in which case "issues" may be bugs, features currently under development, and/or features intended for future development. An ITS may be implemented in an organizational administration scenario, in which case "issues" may be administrative processes or forms (e.g. leave request processes/forms or the like). Many alternative implementations and types of issues are possible.

In order to manage issues, an ITS maintains metadata (for example in a relational database) which defines various operational parameters. ITS metadata can include, for example: one or more issue type definitions, each issue type definition defining a field scheme or field configuration for issues of that type (e.g. the possible fields or data to be maintained by the ITS for issues of a given type); one or more workflow definitions, a workflow definition defining the workflow that applies to an issue of a particular type (e.g. the states an issue can take and the manner in which an issue transitions between those states over its lifecycle); and user permissions (e.g. which users may create issues, view issues, amend issues, change the states of issues etc.). In some cases the ITS may allow the user to change the metadata—e.g. to define new/different issue types, issue type definitions, and/or workflows.

The actual fields defined with respect to an issue type will depend on the requirements of a given ITS implementation. By way of example an issue type definition may define the following fields: a project field storing a project to which an issue belongs; a key field storing a unique identifier for an issue; a description field storing a description of an issue and actions taken with respect to the issue; a status field indicating the stage an issue is currently at in its lifecycle; an assigned person field indicating who (if anyone) an issue has been assigned to; a severity field storing the severity of an issue (e.g. critical, major, minor, etc.); a priority field storing the priority of an issue at a general level (e.g. very high, high, medium, low, very low); and a rank field storing a rank value in respect of an issue (defining a rank order of the issue relative to other issues). Fields may also be provided in order to record and track service level agreements (SLAs). In one implementation SLA fields store time boundary information which define time limits in respect of a given SLA—e.g. when action needs to be taken/an issue needs to be dealt with in order to comply with the SLA.

Figure 2:
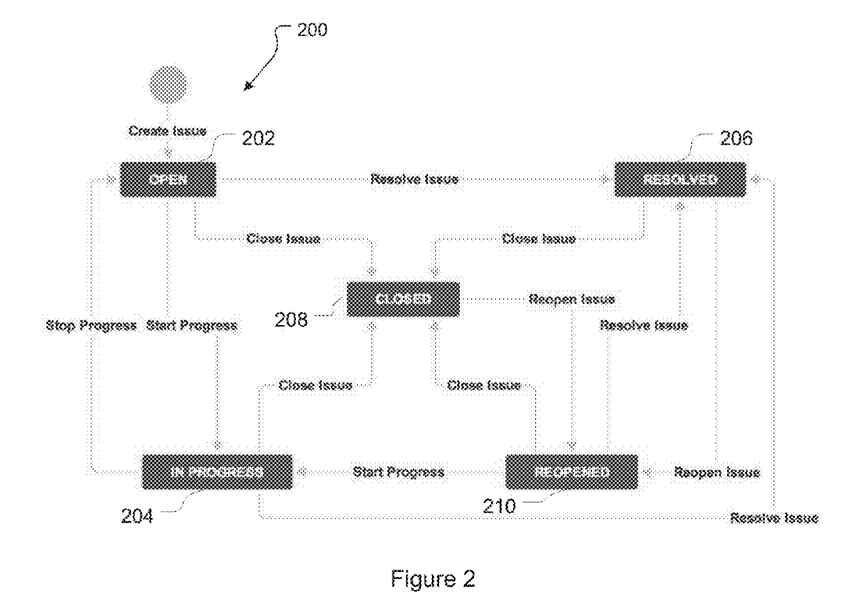
FIG. 2 illustrates an example issue lifecycle.

The workflow associated with a given issue will also depend on the specific requirements of the ITS implementation. By way of one example, FIG. 1 depicts an example lifecycle 100 that could be used in a helpdesk implementation. In lifecycle 100 an issue may take (and transition between): an open state 102; an in progress state 104; a resolved state 106; a closed state 108; and a reopened state 110. Different lifecycles with different states and/or transitions between states will be appropriate for different implementations.

In order to create and progress issues in ITS 100 users interact with appropriate user interfaces provided by an ITS client 114. For example, a user may create a new issue and provide relevant information in respect of the issue (e.g. a particular project the issue is associated with, a description, a priority, any other relevant information catered for). The ITS 100 itself will typically generate a key that can be used to uniquely identify the issue, which may be hidden from or visible to the user. Once an issue has been created a user can interact with it, for example by adding additional information to the issue (e.g. in an issue description or other field), changing the state of the issue (e.g. from in progress to resolved), assigning the issue to another person (e.g. by changing an assigned person field).

Task Scheduling

To assist in managing issues the ability to schedule future work is advantageous.

By way of one example in a service desk context service level agreements (SLAs) may be in place that require certain types of issues (or tickets) to be dealt with in certain timeframes. For issue types that are associated with one or more SLAs it is useful to be able to schedule tasks leading up to the relevant deadline in order to increase the likelihood that the SLA will be complied with.

For example, any type of issue maintained by an ITS can have a SLA associated with it. In order to manage these SLAs, pre-breach and post-breach reminder tasks may be scheduled. For example, a pre-breach reminder task may be scheduled n minutes before they SLA is breached and a post-breach reminder task may be scheduled m minutes after a SLA has been breached (n and m set to be appropriate to the issue in question—e.g. 30 minutes, 1 hour, 4 hours, 1 day, 1 week, 1 month etc.). The scheduled reminder task may, when triggered, operate to send a notification to one or more users notifying them of the impending SLA (in the case of a pre-breach reminder) or of the failure to meet an SLA (in the case of a post-breach task). The notification may be email, a web hook out to an SMS or other communication service, or an alternative notification. A notification can contain a link back to the issue in question.

One method for scheduling tasks is to use an underlying job scheduler, for example Quartz or Cron. This involves generating and scheduling individual tasks by passing them to the job scheduler (e.g. using an appropriate API call) to handle. In the case of an ITS, however, large numbers of tasks may need to be scheduled—e.g. tens of thousands or more. Known job schedulers are not designed to handle such quantities of tasks and trying to use them to handle such volumes can be problematic (e.g. due to memory usage/requirement issues).

In addition, known job schedulers do not make the persistence of tasks programmatically transparent which can make it difficult to query tasks that have been scheduled with the scheduler—for example to view historical information regarding tasks and their processing.

In light of these issues, the present disclosure provides alternative means of scheduling tasks for future execution.

By way of general overview, the systems and methods described herein do not schedule tasks for future execution directly with a job scheduler. Rather, a client that wishes to schedule a task for execution at a future date passes data in respect of that task to the scheduling module 106. The scheduling module 106 receives the task data and stores it in a scheduled task data structure. The scheduling module 106 itself registers a single job with an underlying job scheduler 118. That job is scheduled to execute at or about the time of the earliest scheduled task maintained by the scheduled task data structure. As new tasks are received and added to the scheduled task data structure the scheduling module 106 updates the scheduled job as required (e.g. if a task is added with an earlier target runtime than the execution time scheduled for the registered job the registered job is updated to execute at that earlier time). When the single scheduled job is executed this triggers the scheduling module 106 to process all scheduled tasks with target runtimes before the current time. On completion of this the scheduling module 106 updates the job registered with the underlying job scheduler based on the next target runtime of any scheduled task stored in the scheduled task data structure. In this way a single underlying job scheduler job is used to manage all tasks added to and maintained by the scheduled task data structure.

Various features of the scheduling module 106, its use, and advantages are described in detail below.

Scheduled Task Data Structure

Figure 3:
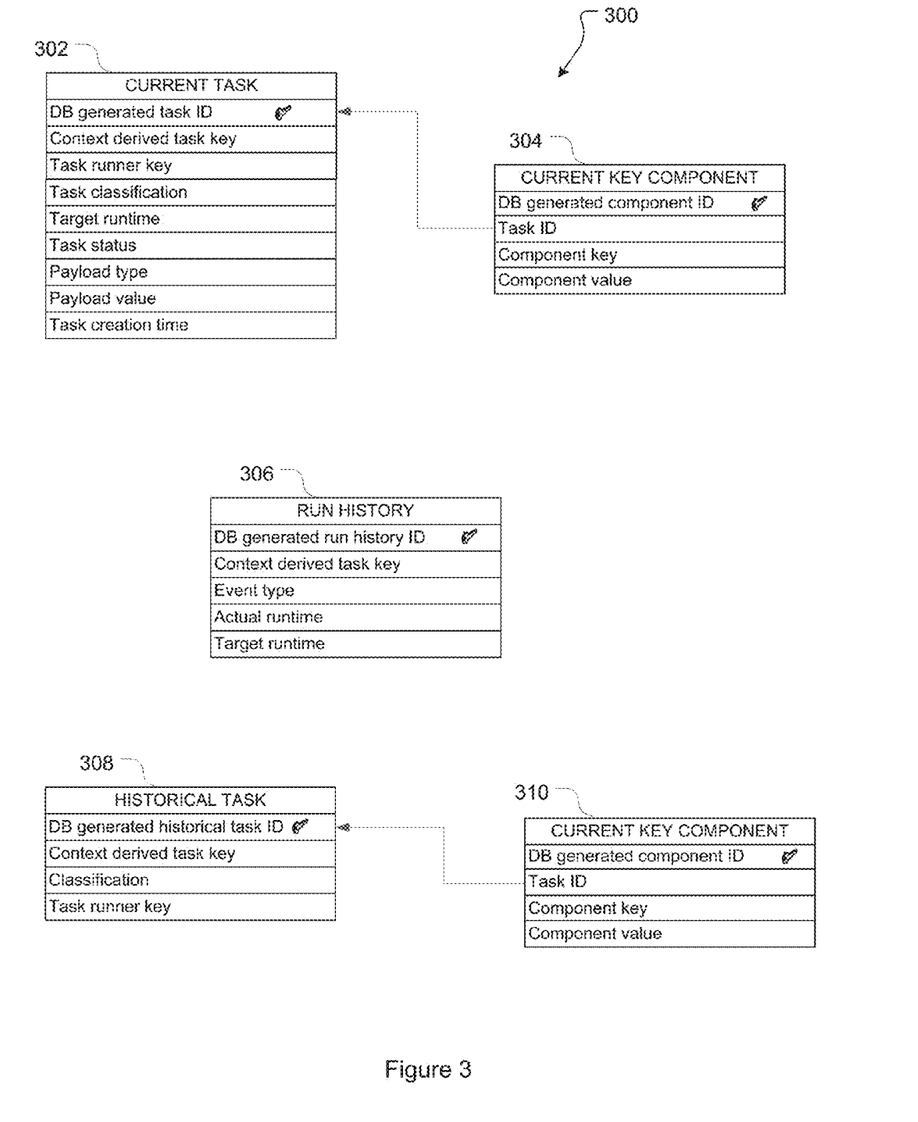
FIG. 3 illustrates an example relational database schema.

The scheduling module 106 maintains information in respect of scheduled tasks in a database. FIG. 3 depicts the database schema 300 for one embodiment. The database persistently stores the information relating to tasks handled by the scheduling module 106. The scheduling module 106 may make use of a database already used by the host application (e.g. database 108 used by the ITS), or may use a separate database (potentially operating on a separate computer with separate storage). By storing task information persistently, even if the host application (e.g. the ITS) fails, the task information is not lost. When the host application is restored the task information is still available and can still be processed (as described below).

The tables and fields of database schema 300 are discussed below. Alternative database schemas with additional/fewer/alternative tables and/or fields may be used to capture and store relevant data.

Current task table 302 is used to store information in respect of current tasks that are passed to the task scheduling module 106. In this implementation table 302 defines the following fields: a database generated task identifier (e.g. an integer); a context derived task key (e.g. a string); a task runner key/identifier (e.g. a string); a task classification (e.g. a string); a target runtime (e.g. an integer); a task status (e.g. a string); a payload type (e.g. a string); a payload value (e.g. a string); a task creation time (e.g. an integer).

Current key component table 304 stores information in respect of current task key components. In this implementation table 304 defines the following fields: a database generated component ID (e.g. an integer); a task ID (linking to the database generated task id stored in the current task table 302); a component key (e.g. a string); and a component value (e.g. a string).

In the present embodiment a context derived task key is generated and stored in addition to the database generated task identifier. The context derived key for a particular task is generated based on context data relating to that task. The context data for a task is made up of one or more context data components which are stored in the current key component table 304 (and identified as being related to a task using the database generated task ID).

Context data can be processed to generate a context derived key in a variety of ways. In one implementation the component values of a task's context data are combined into a single context data string/element and processed using a cryptographic hash function to generate the unique context derived key for the task. A SHA-1 has function is used to generate a unique key that can fit in an indexable database column, though alternative hash or other functions could be used. Processing of context data to derive a key may be performed by the scheduling module based on context data received from a client when initially scheduling the task. Alternatively, generation of the context defined key may be performed by the client that is invoking the scheduling module, in which case the client passes both the derived key and the context data to the scheduling module.

Implementing a context derived key is advantageous as it allows re-derivation of the key for a task record on an as needs basis. Provided the context data for a given task is known the key for the related task can be generated should it become necessary—e.g. if a client needs to query or modify a specific task record. Being able to generate the relevant key as needed alleviates clients from the burden of having to store a unique key in respect of every task scheduled by the client, which is onerous where large numbers of tasks are involved.

In order to facilitate this, the task scheduling module 106 enforces (e.g. via the API) the form of the context data that clients need to provide. Generally, the context data is composed of one or more component parts, each part providing/based on information about the task in question. The context data as a whole (i.e. the combination of the component parts) must be unique so that a unique key can be generated from it. The specific context data component parts are chosen to be data that is already stored/accessible to the client, allowing the client to access those parts and regenerate the key without having to store additional information.

By way of example, in an ITS every issue may have a unique issue/ticket number and schedule tasks to achieve particular purposes for particular issues. In this case the component parts of the context data can include the general purpose for which the task is being scheduled, the specific event the task is being scheduled for, and the issue identifier of the issue to which the task relates. Under this scheme, the context data for an issue with the ticket number 123, a purpose relating to a particular SLA ("SLA-1"), and an expiry event would be ["SLA-1" "Expiry" "123"]. Table A below provides an example of how this context data would be stored in the current key component table 304 (presuming a task ID of 999):

TABLE A

Example current key component table

| DB generated component ID | Task ID | Component Key | Component Value |
|---|---|---|---|
| 1 | 999 | Ticket No. | 123 |
| 2 | 999 | SLA | 1 |
| 3 | 999 | Event | Expiry |

Should the client need to query the task scheduling module 106 in respect of this task it need only access the relevant context data (the IssueID, Purpose, and Event) and process that data using the relevant hash (or other key generation) algorithm in order to regenerate the key. Although the context data as a whole needs to be unique it is not necessary for each constituent part to be unique. In the above example many different tasks may have an "SLA-1" purpose and many different tasks may have "Expiry" events, but a given task can only have one SLA-1 Expiry event.

Using composite context data also allows analytics to be performed by querying the context data field. Appropriate queries can be used to query the records maintained by the scheduled task data structure to identify scheduled tasks related to any one or combination of the parts making up the context data. For example, queries can be formed to identify tasks relating to: particular purposes (e.g. all scheduled tasks in respect of SLAs generally or specific SLAs such as SLA-1); particular events (e.g. all scheduled tasks in respect of expiry events); combinations of events/purposes (e.g. all scheduled tasks in respect of SLA expiry events); particular ticket numbers (e.g. all scheduled tasks in respect of ticket 123). To further assist in this, the composite parts of the context data may have hierarchical or semi-hierarchical structure/relationship.

Alternative component parts for the context data can be selected to be appropriate for a given implementation. For example, the composite parts of the task data may be implemented to permit queries such as: view all scheduled tasks which relate to SLA 30 minute pre-breach notifications and that are relevant to project x; view all scheduled tasks for issues that are "waiting for customer" but which have a resolved status.

Table 302 also provides a task runner key field which records the name (or other identifier) of the underlying scheduler task runner that will (in due course) run the task.

Table 302 also provides a classification field to record a classification for each task. This is a general classification outside the context key components.

Table 302 also provides a target runtime field for storing a target runtime in respect of each task record. The target runtime may be defined in any desired way—for example the number of milliseconds (or alternative time units) from 1 Jan. 1970 GMT (or an alternative time/date).

Table 302 also provides a status field which records the current status of the task. Initially the status of a task will be "scheduled", though over its life the status of a task may change to "running" or "waiting on task" (and/or alternative statuses).

Table 302 also provides payload type and payload value fields for storing information in respect of a payload for each task record. The payload stores data that can be acted on when the scheduled task is run. For example, one payload type may be "email notification reminder", and the payload value may store details of the email server that is to be contacted in order to send the notification when the task is run.

Allowing clients to associate a payload with tasks that are being scheduled further assists in making the tasks as stateless as possible. Not only does the client not need to store a key in order to access the task, it does not need to record what needs to be done when the task becomes due as this is stored in the payload fields and can, for example, be accessed and passed back to the client at the relevant time.

Table 302 also provides a creation time field for recording when the task was created.

In addition to storing current task data in tables 302 and 304, the scheduling module 106 stores historical data in respect of scheduled tasks. The historical task data can be used to analyze actions that have been taken with respect to specific tasks or particular groups of tasks (by querying based on context data as described above).

Run history table 306 stores information on the processing/running of tasks. In this implementation table 306 defines the following fields. A database generated run history ID field. A context derived task key field (e.g. the context derived key described above). An event field (e.g. a string) providing a record of an event that was performed in respect of the identified task. Events in this embodiment include: task scheduled; task rescheduled; task unscheduled; task executed, task unavailable; task succeeded; task failed; task pruned. Additional/alternative events are possible. An actual runtime field records the actual runtime of the task for the particular record. A target runtime field records the target runtime of the task for the particular record.

Where a task is completed—i.e. a task that is no longer trying to run—data in respect of the task is maintained in the historical task table 308 and historical key component table 310. Historical task table 308 stores similar data to current task table 302 (though does not maintain all fields stored in the current task table 302), and the historical key component table 310 stores the same key component data as is stored in the current key component table 304.

Storing historical task data provides transparency with respect to actions that have been performed with respect to scheduled tasks. This transparency, and the analytic possibilities it affords, is difficult (or in some cases not possible) to achieve in systems where tasks are scheduled by passing them directly to a job scheduler.

While a relational database has been described above alternative data structures (in a relational database or otherwise) could be used to store scheduled task data. Furthermore, not all of the fields described above are necessary in all implementations. Fewer, alternative, or additional fields may be used. For example, while the described embodiment uses a context derived key and stores context data in respect of tasks, other embodiments may use an alternative key and not store context data. For example a key may be automatically generated by the scheduling module, passed back to the client and stored by the client to allow the client to identify the task in the future. As an additional example, some embodiments may not maintain any historical task information.

Populating the Scheduled Task Data Structure

When a client wishes to schedule a task it generates the relevant data and submits this to the scheduling module 106 via an API call. In the present embodiment the client is the ITS, however the client could be any system which schedules tasks using the scheduling module (or features thereof) described herein.

The data generated for a given task (and submitted via the API call) can include context data in respect of the task (the components of which are stored in the current key component table 304), a target runtime (stored in current task table 302), a task runner identifier, and payload information (stored in current task table 302). At a minimum a target runtime and sufficient identifying information (in order to allow the task to be uniquely identified) are necessary. A payload may not always be necessary.

In some implementations the client itself may generate the context-derived key for the task (from the context data) and pass this to the scheduling module 106 via the API call as well.

As described above, the context data (and its composite parts) is defined by the scheduling module 106. The format of the target runtime is also defined by the scheduling module 106.

The payload for a given task is passed to the task runner when the task is run. As described above, when generating a task to be scheduled the client generates context data which is to be used to identify the task. The client also generates payload information/details that are to be used when the task is run. The task is then scheduled against the context data. When a task run the context data and the payload for the task are passed to a task runner (identified by the task runner key in the current task table 302). The task runner uses the component parts of the context data to determine the code that is to be executed and invokes that code passing in the payload data. Accordingly, the client generates the task payload with the actions/functions that are to be performed at the target runtime in mind. For example, a client may schedule tasks: to close tickets/issues after five days; to periodically create issues at the end of the month; to collect statistics about the state of issues at the end of each week.

Figure 4:
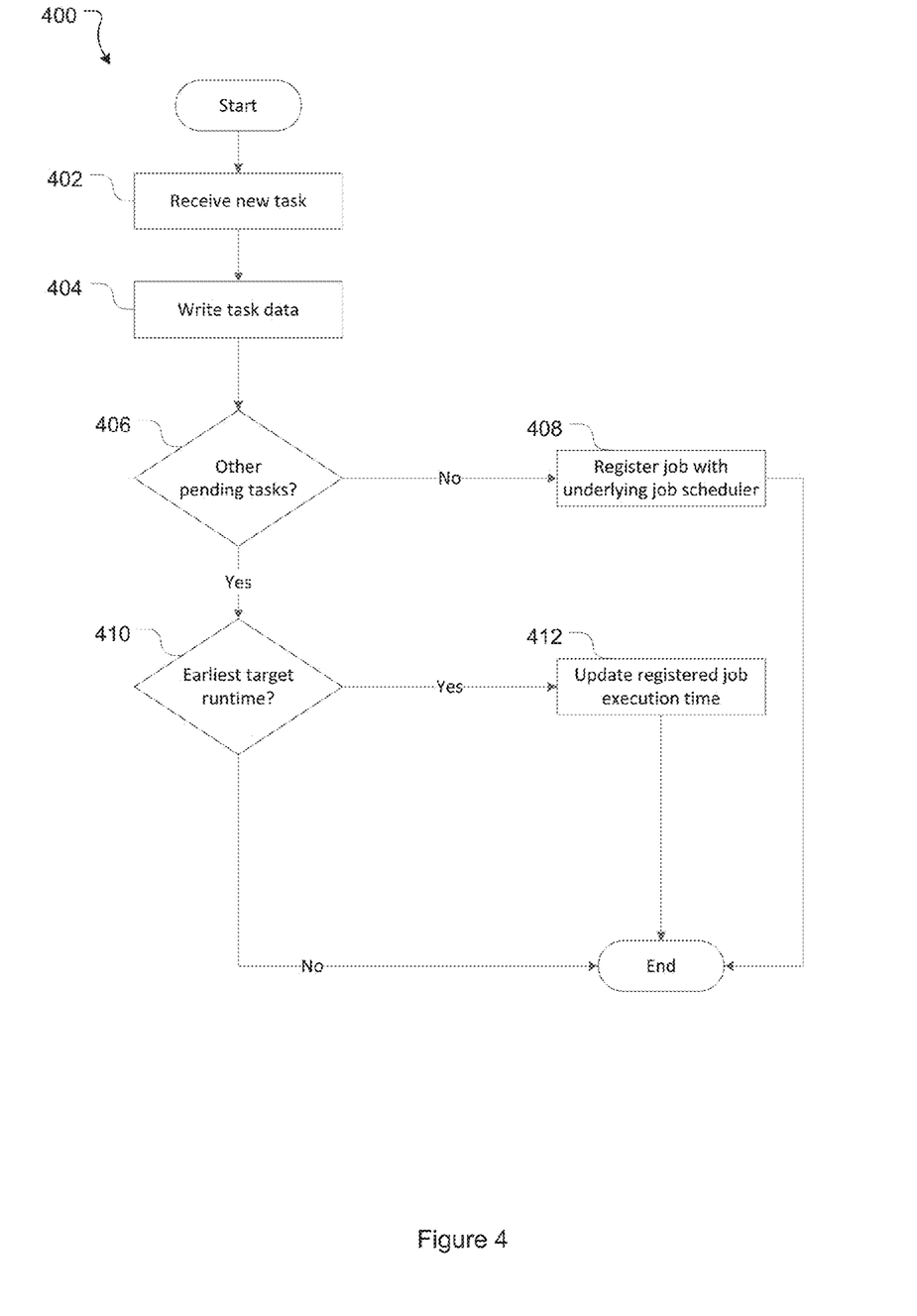
FIG. 4 illustrates a process for scheduling a task.

The processing performed by the scheduling module 106 on receiving an API call with a new task will be described with reference to flowchart 400 of FIG. 4.

At 402 the scheduling module 106 receives data in respect of a new task, for example in an API request.

At 404 the scheduling module 106 processes the data received at 402 and writes data to the relevant fields in the scheduled task data structure (e.g. in tables 302 and 304). If any processing of the data received in the API request is required this is also performed—for example if the scheduling module 106 needs to generate a context derived key from context data received in the API request. Tasks written to the data structure are given a scheduled status.

At 406 a check is made to see whether there are any tasks with a scheduled status in the current task table 302 other than the task currently being scheduled.

If, at 406, there are no other tasks with a scheduled status in the scheduled task data structure, no scheduling module job will currently be registered with an underlying job scheduler. In this case a new job is registered with the underlying job scheduler at 408. The job is registered to trigger/execute at or about the target runtime of the current task (i.e. the task written to the scheduled task data structure at 404) and, on execution, to perform the task execution process described below with reference to FIG. 5.

If, at 406, there are other tasks with a scheduled status, a scheduling module job will have previously been registered with the underlying job scheduler. In this case a check is made at 410 to see if the target runtime of the current task is the earliest target runtime of the scheduled task(s) stored in the scheduled task data structure. This can be achieved, for example, by querying the scheduled task data structure to identify the earliest target runtime of an existing scheduled task and comparing the target runtime of identified task against the target runtime of the current task. If the target runtime of the current task is earlier (less than) than the target runtime of the identified existing task it has the earliest target runtime.

If, at 410, the current task does not have the earliest target runtime of the pre-existing scheduled task(s), no further action is taken. In this case the scheduling module job will have an execution time earlier than the time target runtime of the current task and there is no need at this stage to change that execution time.

Conversely, if at 410 the current task is determined to have the earliest target runtime of the pre-existing scheduled task(s) the execution time of the scheduling module job is updated at 412. In this case the execution time of the scheduling module job is updated to be at (or about) the target runtime of the current task at 412.

Any job scheduler may be used to manage execution of the job registered at 408 and rescheduled at 412. This includes available job schedulers (such as Quartz, Cron, or other existing job schedulers) or a job scheduler application/library specifically written for this purpose.

Task Execution

Figure 5:
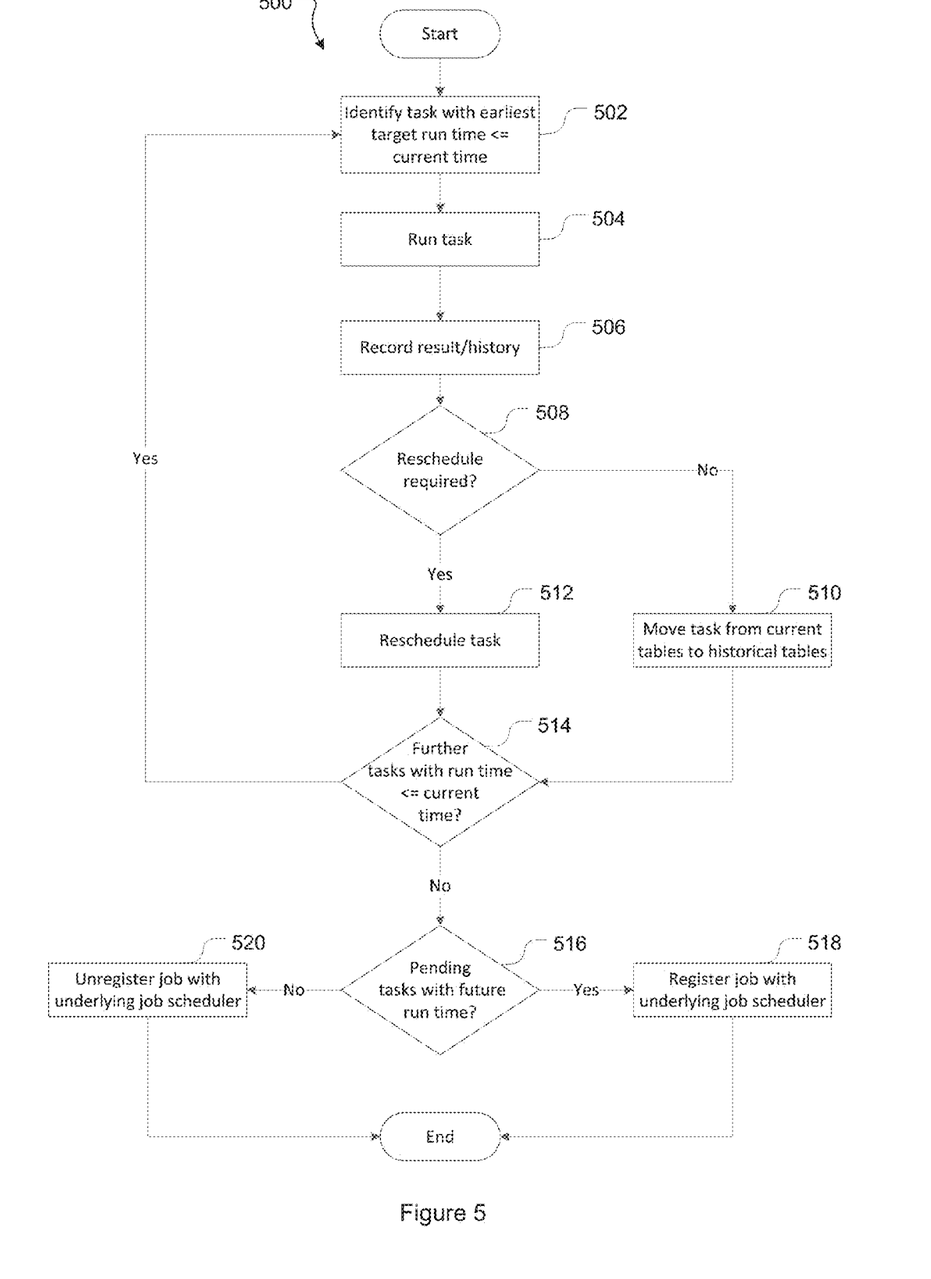
FIG. 5 illustrates a process for executing scheduled tasks.

The scheduled task data structure can maintain information on a huge number of tasks with target runtimes falling at any future date (or, in some cases, any past date). As described above, the scheduling module maintains a job with an underlying job scheduler. When that job triggers process 500 of FIG. 5 is performed.

At 502 the scheduled task data structure is queried to identify the task in the current task table 302 with a scheduled status and the earliest target runtime before (or at) the current time. If for some reason there is no scheduled task with a target runtime that is before/at the current time the process proceeds to 512 to update the job registered with the underlying job scheduler.

At 504 the task identified at 502 is run by the runner application. The runner application uses the context data for the task and the payload data which is passed to it as part of the hand off. As a result the runner application can, to an extent, be agnostic to the specifics of what it is to do. For example, the runner application may know to send email reminders but not what issue it sends them about and/or what email server to use—that information is retrieved from the context data and/or the payload.

In the present embodiment running a task returns a run response indicating that: running the task was successful; running the task was successful and the task is to be rescheduled (in which case a new runtime is also returned); running the task failed; running the task failed and the task is to be rescheduled. If running a task throws an exception (or simply does not return) it is recorded as failed (without rescheduling).

At 506 records in respect of the task are updated based on the running of the task and the task run result. The run history table 306 is populated to record: the task key of the task run at 504 (in the task key field), the run result or action taken based on the run result (in the event field), the target runtime for the task that caused it to be run at 504 (in the target runtime field), and the actual runtime at which the task was run (in the actual runtime field). This generates an audit trail of the previously run tasks.

At 508 the run result of the task run at 504 is checked to see if the run result indicates that the task needs to be rescheduled.

At 510, if the task does not need to be rescheduled the task record is deleted from the current task table 302 and added to the historical task table 308. If necessary key component data in respect of the task are also deleted from the current key component table 304 and added to the historical key component table 310. The process then proceeds to 514.

At 512, if the run result is such that the task needs to be rescheduled, the target runtime for the task maintained in the current task table 302 is updated to reflect the new target runtime.

At 514 a check is made to see if there are any further tasks stored in the current task table 302 which have a scheduled status and a target runtime before the current time. If so, the process returns to 502 to run the additional tasks.

If, at 514, there are no further scheduled tasks which have a target runtime before the current time, a check is made at 526 to see whether there are any scheduled tasks that have a future target runtime (i.e. a runtime after the current time).

If, at 516, there are one or more scheduled tasks with a future target runtime, the scheduling module registers a job with the underlying job scheduler at 518. The job is registered to execute at (or about) the target runtime of the scheduled task with the next target runtime after the current time. The process is then complete.

If, at 516, there are no more scheduled tasks, the scheduling module does not currently require a job to be scheduled with the underlying job scheduler. In this case the job registered by the scheduling module is cancelled/unscheduled at 520 and the process finishes.

System Recovery

If the underlying job scheduler or host fails (or is restarted), the job registered with the underlying job scheduler that would, on execution, have initiated the task execution process 500 may be lost.

In order to account for this, when the system recovers after a crash or is restarted the scheduled task data structure is queried to determine the earliest target runtime of any scheduled tasks that are stored. If the earliest target runtime identified is before the current time, task execution process 500 commences. If the earliest target runtime identified is after the current time, the scheduling module registers a job with the underlying job scheduler to execute at or about the earliest target runtime.

If the job registered with the underlying job scheduler is missed for any reason (e.g. due to system downtime) the target runtimes for one or more tasks stored in the scheduled task data structure may be missed. Any such tasks are, however, captured by the task execution process 500 described above. Specifically, by iterating through any scheduled tasks with an earlier target runtime than the current time, any tasks that should have been run at an earlier time but were missed are run.

Scheduled Task Data Structure Maintenance

In order to keep the number of tasks stored by the scheduled task data structure manageable old completed tasks (i.e. that have been successfully run and not rescheduled) are periodically deleted from the scheduled task data structure. They may be maintained in an archive data structure for future analytic purposes if desired.

In one embodiment deletion of old completed tasks is performed by a pruner process which is periodically run to delete all completed tasks that have a run date older than a predefined expiry period (e.g. older than N days). By way of example, the process may be run on a daily basis and the predefined expiry period may be 90 days.

Analysis

As discussed above, historical task data can be queried for analytical purposes.

For example, if a task fails the data associated with that task can be analyzed to try and determine why the task failed. As one example, a task may fail because an upstream requirement (such as an email server) may no longer be available. In this case being able to examine the payload when analyzing the task to determine the reason for failure it can be determined that mail server x is no longer around. Without the payload data this type of analysis is typically either not possible or very difficult.

More sophisticated analysis can also be performed. For example, and as described above, the constituent parts of the context data can be used to identify different groups of tasks. Analysis may show that a high percentage of certain types of tasks (i.e. tasks that have context data with one or more common constituent parts) fail. This may point to a more systemic issue with tasks of that type that should be addressed.

By way of example, historical data could be used to look for the number of issues that were automatically closed due to a failure to respond. As a second example, historical data could be analyzed to determine that a certain percentage of reminders have failed due to upstream mail servers going down between particular times (e.g. between 5 and 6 pm EST).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
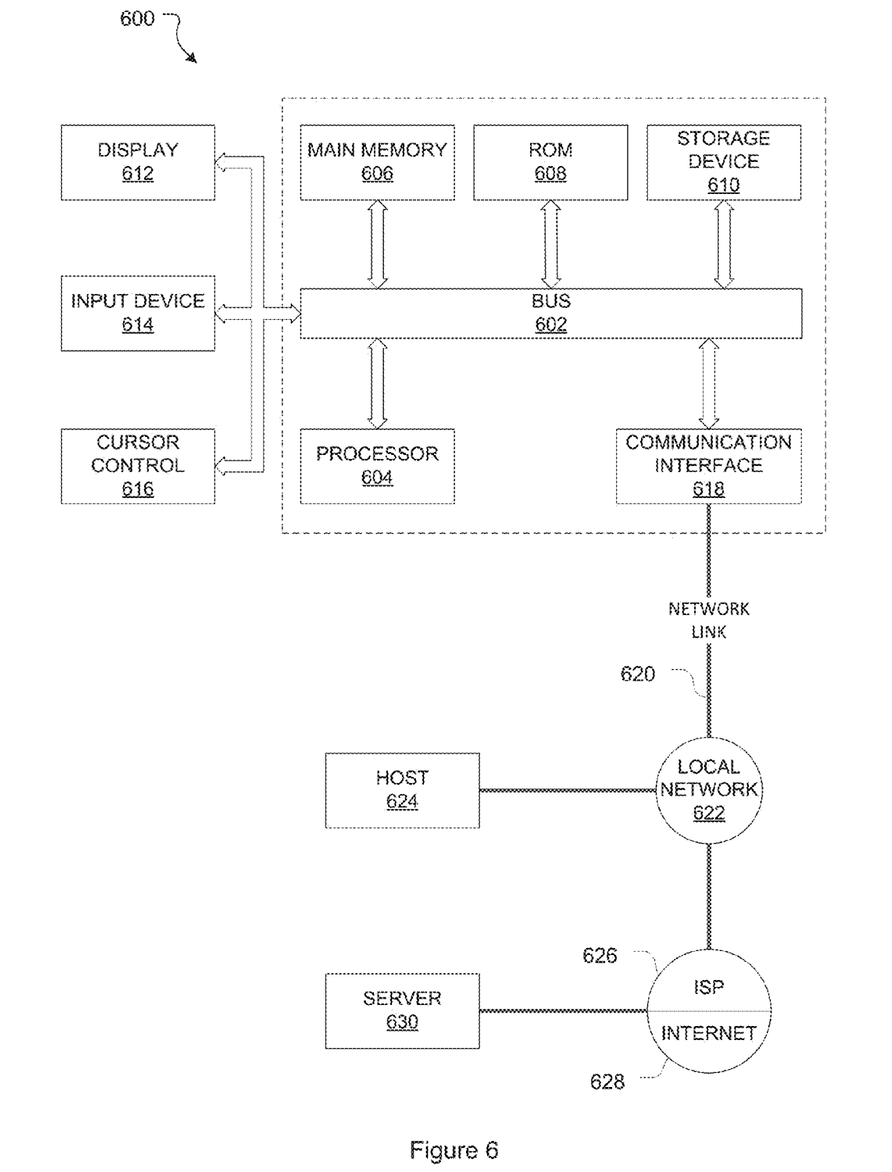
FIG. 6 illustrates a computer system which may be used to implement various embodiments.

For example, FIG. 6 is a block diagram that illustrates a computer system 600 upon which an embodiment of the invention may be implemented. Server computer 102 and/or user computer 112 may be computer systems such as 600.

Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to one more output devices such as a display 612 for displaying information to a computer user. Display 612 may, for example, be a cathode ray tube (CRT), a liquid crystal display (LCD), a light emitting diode (LED display), or a touch screen display. An input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Additional and/or alternative input devices are possible, for example touch screen displays.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

A computer system may take a variety of forms. For example, a client computer 106 may be a desktop computer, a laptop computer, a notebook computer, a tablet computer, a smart phone, or other computer.

In the embodiments described above the scheduling module (and the various features and functions it performs) is described as a plugin for use with a host. Alternative implementations are possible. For example, the scheduling module may be implemented to be integral/native to a broader computer program or application. The scheduling module could alternatively be implemented as a stand-alone application that communicates with other applications in order to perform the relevant functions.

In addition, while the scheduling module has been described in relation to providing scheduling functionality for an ITS it could also be used in conjunction with alternative systems/applications, such as managed documentation systems. Such systems may manage a large corpus of documents and policies that must be periodically reviewed for relevance (e.g. every 6 months). In this case the scheduling features described above can be used to schedule certain reminders for each document. ITS tickets could be automatically created to track the required review work via those scheduled reminders.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

A number of flowcharts are provided in order to illustrate processing or functional steps. Although these flowcharts define steps in particular orders to explain various features in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method for scheduling a new task, the method comprising:
    receiving task data in respect of the new task, the task data comprising at least information enabling the new task to be uniquely identified and a target runtime for the new task;
    recording the received task data in a data structure;
    determining whether a job configured to execute tasks out of the data structure has already been registered with an underlying job scheduler;
    in response to determining that the job has not already been registered with the underlying job scheduler, registering the job with the underlying job scheduler for execution at or about the target runtime of the new task;
    in response to determining that the job has already been registered with the underlying job scheduler:
        determining whether the target runtime for the new task is before a current runtime for the job,
        in response to determining that the target runtime for the new task is before the current runtime for the job, updating the current runtime for the job within the underlying job scheduler to be at or about the target runtime of the new task,
        in response to determining that the target runtime for the new task is not before the current runtime for the job, maintaining the current runtime for the job;
    wherein, when the job is executed by the underlying job schedule, the job identifies within the data structure one or more tasks which have a runtime that is at or before a current time, causes the one or more tasks to be executed, and in response to a determination that at least one pending task still remains within the data structure re-registers with the underlying job scheduler with a runtime that is at or about an earliest runtime of pending tasks within the data structure.

2. The computer implemented method of claim 1, wherein determining whether the target runtime for the new task is before the current runtime for the job comprises:
  comparing the target runtime of the new task with target runtimes of any existing scheduled tasks stored in the data structure; and
responsive to the target runtime of the new task being earlier than the target runtimes of any existing scheduled tasks stored in the data structure, determining that the target runtime for the new task is before the current runtime for the job.

3. The computer implemented method of claim 1, wherein the information enabling the new task to be uniquely identified comprises context data in respect of the new task.

4. The computer implemented method of claim 3, wherein the method further comprises processing the context data to generate a unique key in respect of the new task.

5. The computer implemented method of claim 4, wherein processing the context data to generate the unique key in respect of the new task comprises generating a cryptographic hash of the context data and using the cryptographic has as the unique key for the new task.

6. The computer implemented method of claim 1, wherein the task data received in respect of the new task comprises a payload defining one or more actions to be performed when the new task is run.

7. The computer implemented method of claim 1, wherein the job causing the one or more tasks to be executed comprises, for each task of the one or more tasks, communicating a payload associated with that task to a client that initially caused storage of the task in the data structure.

8. The computer implemented method of claim 1, wherein when the job executes a given task of the one or more tasks, executing the given task comprises:
  receiving a run result for the given task;
  storing the run result for the given task in the data structure; and
  responsive to the run result of the given task indicating that the given task needs to be rescheduled, rescheduling the given task by storing a new target runtime for the given task in the data structure.

9. The computer implemented method of claim 1, wherein when the job executes a given task of the one or more tasks, executing the given task comprises recording information in respect of the running of the given task in the data structure.

10. A system for scheduling a new task, the system comprising:
  one or more processors;
  one or more non-transitory computer-readable storage media storing sequences of instructions which, when executed by the one or more processors, cause the one or more processors to:
  receive task data in respect of the new task, the task data comprising at least information enabling the new task to be uniquely identified and a target runtime for the new task;
  record the received task data in a data structure;
  determine whether a job configured to execute tasks out of the data structure has already been registered with an underlying job scheduler;
  in response to determining that the job has not already been registered with the underlying job scheduler, register the job with the underlying job scheduler for execution at or about the target runtime of the new task;
  in response to determining that the job has already been registered with the underlying job scheduler:
  determine whether the target runtime for the new task is before a current runtime for the job,
  in response to determining that the target runtime for the new task is before the current runtime for the job, update the current runtime for the job within the underlying job scheduler to be at or about the target runtime of the new task,
  in response to determining that the target runtime for the new task is not before the current runtime for the job, maintain the current runtime for the job;
  wherein, when the job is executed by the underlying job schedule, the job identifies within the data structure one or more tasks which have a runtime that is at or before a current time, causes the one or more tasks to be executed, and in response to a determination that at least one pending task still remains within the data structure re-registers with the underlying job scheduler with a runtime that is at or about an earliest runtime of pending tasks within the data structure.

11. The system of claim 10, wherein determining whether the target runtime for the new task is before the current runtime for the job comprises:
  comparing the target runtime of the new task with target runtimes of any existing scheduled tasks stored in the data structure; and
responsive to the target runtime of the new task being earlier than the target runtimes of any existing scheduled tasks stored in the data structure, determining that the target runtime for the new task is before the current runtime for the job.

12. The system of claim 10, wherein the information enabling the new task to be uniquely identified comprises context data in respect of the new task.

13. The system of claim 12, wherein the instructions further cause the one or more processors to process the context data to generate a unique key in respect of the new task.

14. The system of claim 13, wherein processing the context data to generate the unique key in respect of the new task comprises generating a cryptographic hash of the context data and using the cryptographic has as the unique key for the new task.

15. The system of claim 10, wherein the task data received in respect of the new task comprises a payload defining one or more actions to be performed when the new task is run.

16. The system of claim 10, wherein the job causing the one or more tasks to be executed comprises, for each task of the one or more tasks, communicating a payload associated with that task to a client that initially caused storage of the task in the data structure.

17. The system of claim 10, wherein when the job executes a given task of the one or more tasks the instructions further cause the one or more processors to:
  receive a run result for the given task;
  store the run result for the given task in the data structure; and
  responsive to the run result of the given task indicating that the given task needs to be rescheduled, reschedule the given task by storing a new target runtime for the given task in the data structure.

18. The systems of claim 10, wherein when the job executes a given task, the instructions further cause the one or more processors to record information in respect of the running of the given task in the data structure.

* * * * *